United States Patent [19]

Chan et al.

[11] Patent Number: 5,345,577
[45] Date of Patent: Sep. 6, 1994

[54] DRAM REFRESH CONTROLLER WITH IMPROVED BUS ARBITRATION SCHEME

[75] Inventors: Tzoyao Chan, Saratoga; Milton Cheung, Fremont, both of Calif.

[73] Assignee: Chips & Technologies, Inc., San Jose, Calif.

[21] Appl. No.: 981,329

[22] Filed: Nov. 24, 1992

Related U.S. Application Data

[62] Division of Ser. No. 420,851, Oct. 13, 1989, abandoned.

[51] Int. Cl.[5] .............................................. G06F 13/28
[52] U.S. Cl. .............................. 395/425; 364/DIG. 1; 364/DIG. 2; 364/242.6; 364/238.3; 395/275
[58] Field of Search ............................ 395/425, 275; 364/200 MS File, 900 MS File

[56] References Cited

U.S. PATENT DOCUMENTS

| | | | |
|---|---|---|---|
| 4,760,521 | 7/1988 | Rehwald et al. | 395/425 |
| 4,787,032 | 11/1988 | Culley | 395/725 |
| 4,796,232 | 1/1989 | House | 365/189.03 |
| 4,884,234 | 11/1989 | Keys et al. | 395/425 |
| 4,991,112 | 2/1991 | Callemyn | 395/425 |
| 5,072,420 | 12/1991 | Conley et al. | 395/425 |
| 5,125,088 | 6/1992 | Culley | 395/500 |
| 5,179,667 | 1/1993 | Iyer | 395/275 |
| 5,179,705 | 1/1993 | Kent | 395/725 |
| 5,193,193 | 3/1993 | Iyer | 395/725 |

*Primary Examiner*—Joseph L. Dixon
*Assistant Examiner*—Matthew M. Kim
*Attorney, Agent, or Firm*—Townsend and Townsend Khourie and Crew

[57] ABSTRACT

A cache controller with both burst and hidden refresh modes. In the burst mode, refresh requests are counted, but not acted on, until a predetermined number of refresh requests have been received. At that time, multiple refreshes are done in a single sequence. Although the amount of time taken for actually refreshing the memory is the same, the time needed for arbitration to obtain control of the necessary busses is reduced, giving an overall savings of time. In the hidden refresh mode, a refresh is done, but no hold signal is sent back to stop the CPU while the refresh is being done. Circuitry is provided which allows local memory accesses, but holds other memory accesses until the refresh is completed. Thus, local memory accesses, which expect data quickly, are not inhibited and other memory accesses, which the CPU expects may take some time, can be held up without the CPU knowing.

1 Claim, 6 Drawing Sheets

DRAM REFRESH CONTROLLER WITH IMPROVED BUS ARBITRATION SCHEME

This is a division of application Ser. No. 07/420,851 filed Oct. 13, 1989, now abandoned.

BACKGROUND

The present invention relates to computer chips for controlling access to a cache memory.

In International Business Machine (IBM) compatible personal computers, the refresh controller sends out one refresh address every 15 microseconds. Each refresh cycle takes around 1 microsecond to refresh all of the system's dynamic memory. In order to keep valid data in dynamic random access memory (RAM), 256 refresh cycles are required every four milliseconds. To enter the refresh cycle, a refresh counter sends out one refresh request every 15 microseconds and a hold request signal is then sent back to the CPU to relinquish the bus to the refresh controller. The CPU regains the bus after the refresh cycle is done.

SUMMARY OF THE INVENTION

The present invention provides a cache controller with both burst and hidden refresh modes. In the burst mode, refresh requests are counted, but not acted on, until a predetermined number of refresh requests have been received. At that time, multiple refreshes are done in a single sequence. Although the amount of time taken for actually refreshing the memory is the same, the time needed for arbitration to obtain control of the necessary busses is reduced, giving an overall savings of time. In the hidden refresh mode, a refresh is done, but no hold signal is sent back to stop the central processing unit (CPU) while the refresh is being done. Circuitry is provided which allows local memory accesses, but holds other memory accesses until the refresh is completed. Thus, local memory accesses, which expect data quickly, are not inhibited and other memory accesses, which the CPU expects may take some time, can be held up without the CPU knowing.

For a fuller understanding of the nature and advantages of the invention, reference should be made to the ensuing detailed description taken in conjunction with the accompanying drawings.

DETAILED DESCRIPTION OF THE PREFERRED EMBODIMENTS

In a standard advanced technology (AT) style refresh scheme, the refresh request pulse is sent out every 15.6 usec by a refresh counter. After bus arbitration, HOLD is generated and sent back to the CPU. The CPU relinquishes the bus by issuing HLDA. The REF-, XMEMR-, and REF ADDRESS are generated to refresh both on board and AT bus memory by using RAS-only refresh scheme.

Figure 1:
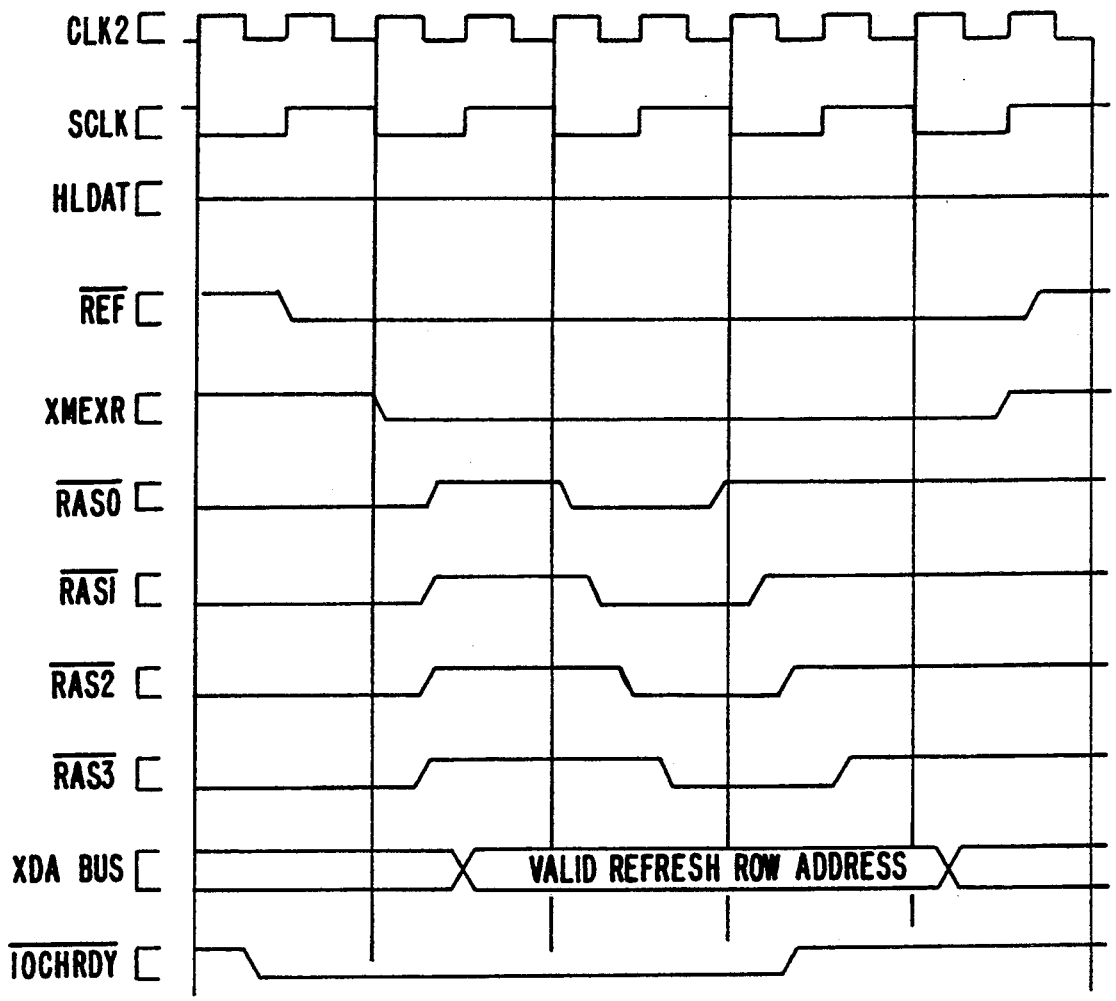
FIG. 1. is a timing diagram of a of a prior art advanced technology (AT) refresh cycle.

FIG. 1 shows the timing of standard AT refresh cycle.

Figure 2:
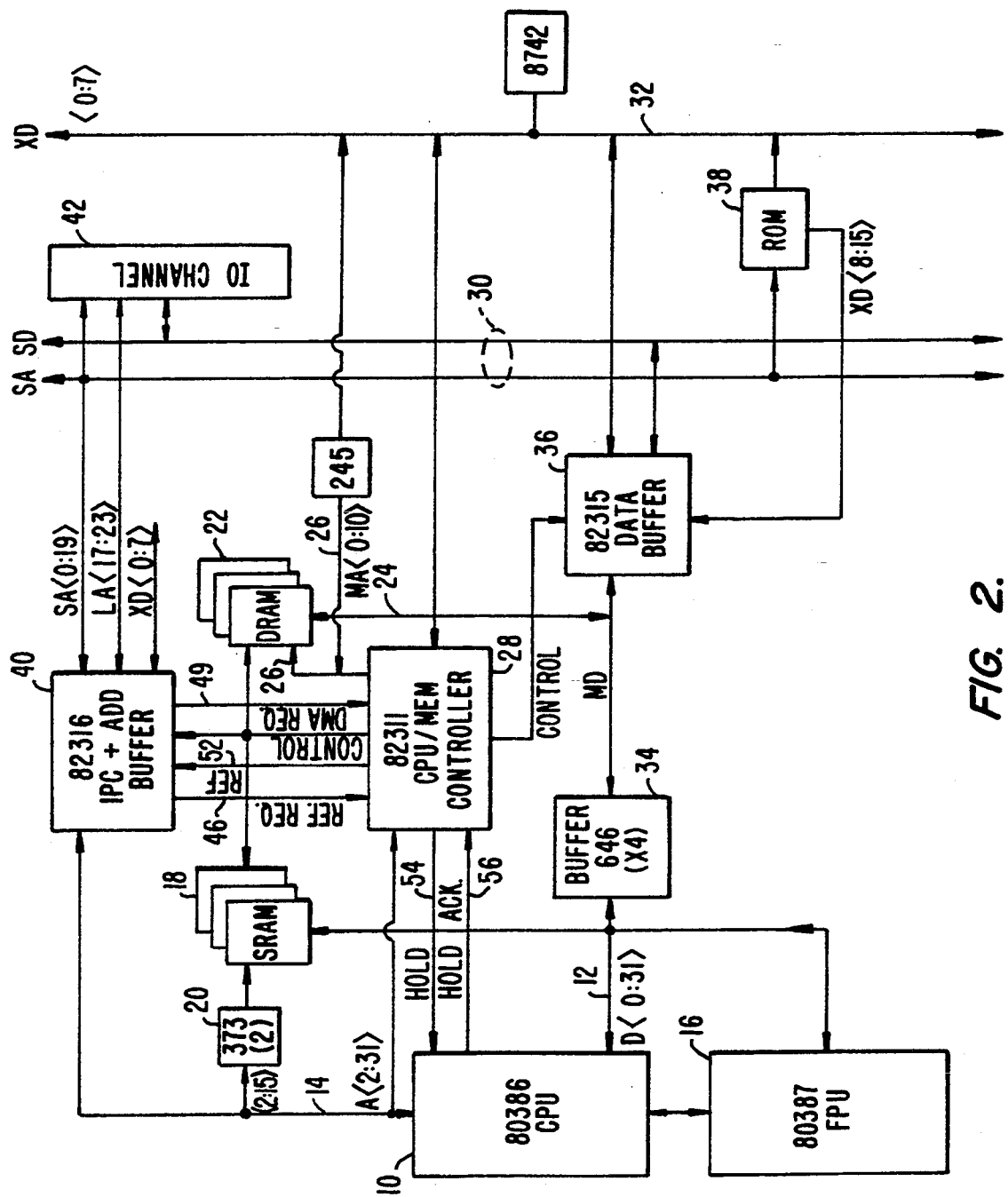
FIG. 2 is a diagram of a typical system in which a cache controller according to the present invention would operate.

FIG. 2 shows a typical system in which a cache controller according to the present invention would operate. The CPU 10 is coupled to a local data bus 12 and a local address bus 14. A floating point unit 16 is also coupled to data bus 12. A static RAM (random access memory) 18 is coupled to the local data bus 12 and address bus 14 through buffer 20. The main, dynamic RAM memory 22 is coupled to a memory bus including a memory data bus 24 and a memory address bus 26. This memory bus is controlled by a CPU/memory controller 28 which includes the present invention.

Other busses include an AT bus 30 (with an address portion, SA, and a data portion, SD) and a peripheral data bus 32. Additional data buffers 34 and 36 are provided, and a ROM (read only memory) 38 is provided between the AT and peripheral busses. A circuit 40 acts as a DMA, timer and interrupt controller. Controller 40 is coupled to input/output (I/O) channel 42.

Figure 3:
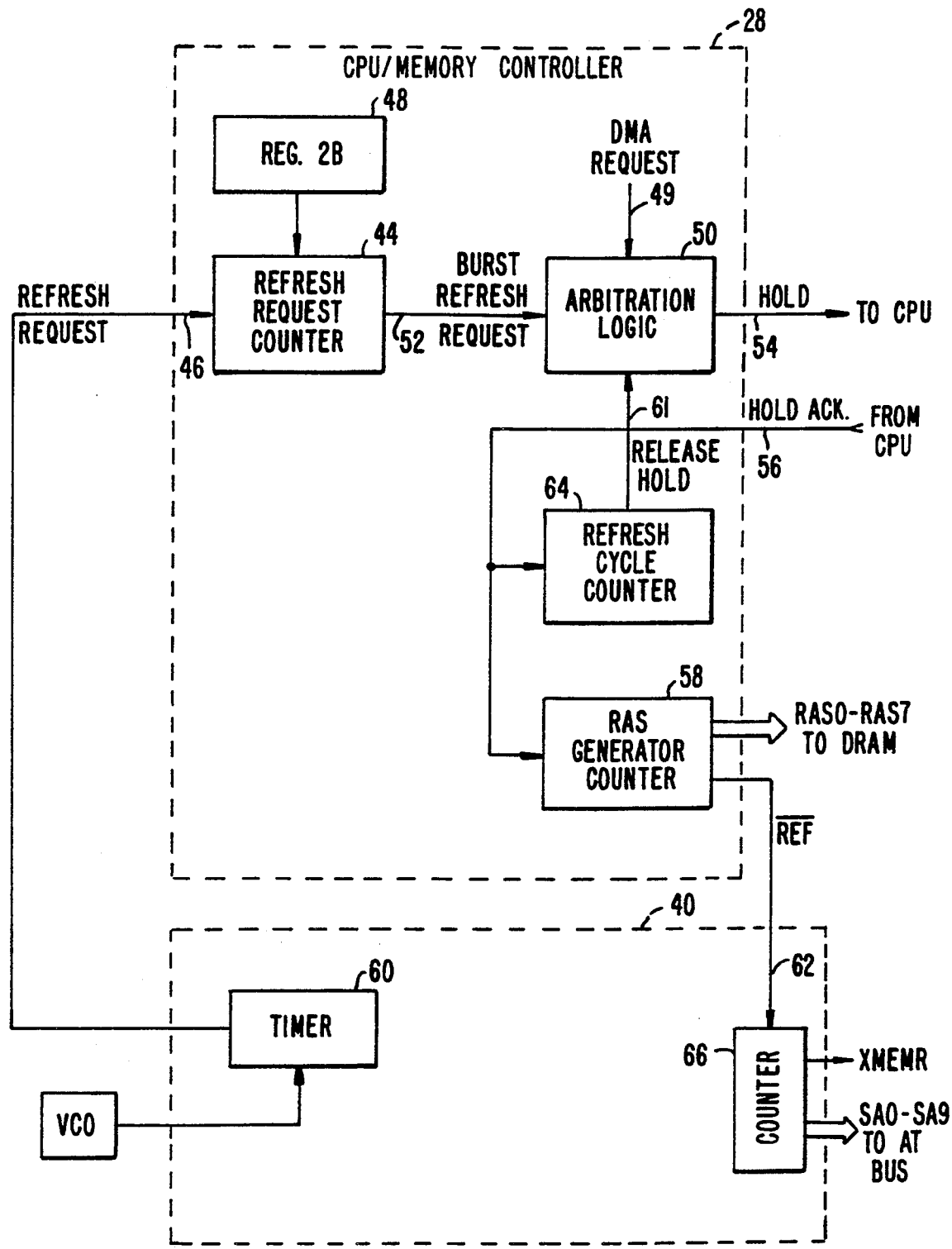
FIG. 3 is a block diagram of the burst refresh control circuitry of the present invention.

FIG. 3 shows circuitry for controlling the burst mode refresh of the present invention and is contained in blocks 28 and 40 of FIG. 2. A refresh request counter 44 is toggled by each "1" bit on refresh request control line 46 which is coupled to a timer 60 in controller 40. The number of counts required before counter 44 generates an output is controlled by a register 48, which is user programmable. If, for instance, the count is programmed at 4, 4 refresh request signals will be received before a burst refresh request is sent to bus arbitration logic 50 on a control line 52. Arbitration logic 50 will then produce a hold signal to the CPU 10 on a control line 54.

A hold acknowledge signal received back from the CPU on a control line 56 is provided to a refresh cycle counter 64 and RAS generator counter circuit 58. This circuitry provides the refresh signals and control signals to local DRAM. A REF signal is produced on line 62 to a counter 66 in controller 40. Counter 66 produces the refresh signals for the AT bus. When refresh is completed, refresh cycle counter 64 produces a refresh finish signal on a control line 61 to arbitration logic 50, which will release the hold on line 54 to the CPU.

Figure 4:
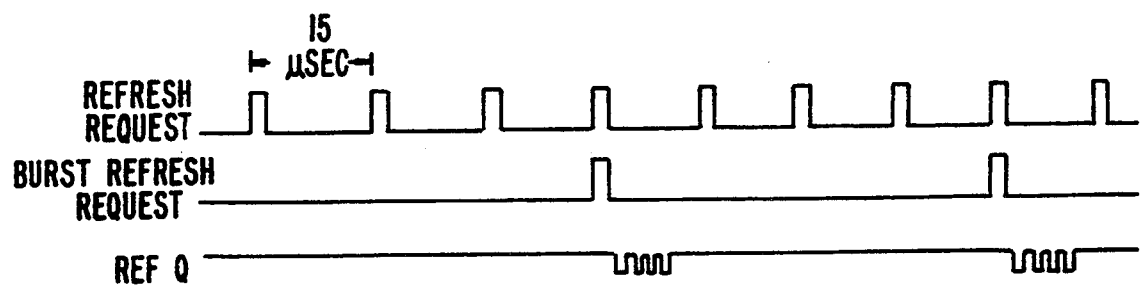
FIG. 4 is a timing diagram showing the burst refresh timing.

FIG. 4 shows the timing of the present invention for a refresh burst count of 4. The first line shows the refresh request pulse, which is generated every 15 microseconds. As can be seen, 4 of the pulses are generated before the burst refresh request pulse on the second line is produced. Immediately upon the burst refresh pulse, the third line shows 4 refresh clock cycles in sequence. After the conclusion of the 4 cycles, the hold is released and no refresh is done until a next burst refresh request is received.

As can be seen, the amount of time required for bus arbitration logic 50 to gain control of the bus needs to be used only once for every 4 refresh request signals, rather than 4 times as in the prior art. Accordingly, only one-fourth of the normal arbitration time during refresh is required.

A second aspect of the present invention provides a "hidden refresh" mode. In a cache based system, most of the time data is read back from the data cache RAM during a cache read hit cycle, and the DRAM is used only during read miss, DMA, and write cycles. The above DRAM cycles account for only 10 to 20% of the system cycles, therefore the DRAM is usually in the idle state. One way to improve the system performance is to take advantage of the DRAM idle time and refresh it without the attention of the CPU.

When a refresh request is pending and there is no DMA, AT or DRAM access, hidden refresh starts. The hidden refresh is transparent to the CPU and will allow the CPU to continue to operate from its cache memory. No HOLD is sent to the CPU. The CPU must wait for all other accesses requiring the DRAM. All DMA and AT accesses are deferred until the completion of ongoing hidden refresh cycle.

Figure 5:
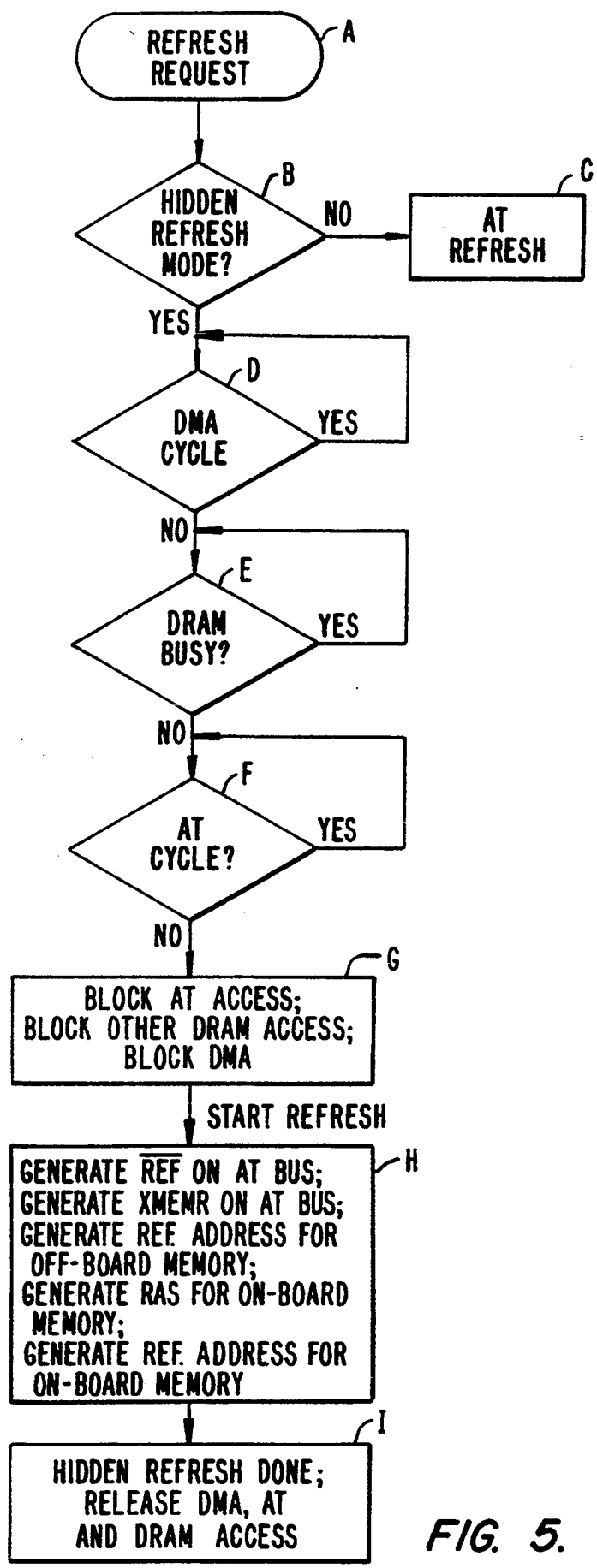
FIG. 5 is a flow chart of the hidden refresh sequence according to the present invention.

FIG. 5 is a flow chart of hidden refresh operation. When a refresh request is received (step A), the system checks to see whether it is in the hidden refresh mode (step B). If it is not, a normal AT refresh is done (step C). If hidden refresh has been selected, the system checks to see if there is an ongoing DMA cycle (step D) o If there is, the system waits until the cycle is completed. Next, a check is done to see if the DRAM is busy with an access (step E). If it is, again the system waits until the DRAM access is completed. Finally, a check is done to see if there is an AT cycle in progress (step F). If it is, again the system waits until the AT cycle is completed. In each case, a bit is set indicating that a hidden refresh is desired, and thus will gain priority over a subsequent DMA, DRAM or AT cycle.

After ascertaining that there is no competing DMA cycle, DRAM access or AT cycle, the system blocks future AT accesses, DRAM accesses and DMA cycles (step G). Refresh is then started by generating an REF signal on the AT bus (step H). The XMEMR signal is also generated. This signal is used to signal a memory refresh cycle on the I/O channel. The refresh addresses are generated for the off-board memory as well as the RAS signals for the on-board memory and the refresh addresses for the on-board memory. Upon completion of the hidden refresh, the DMA, AT and DRAM accesses are released (step I).

Figure 6:
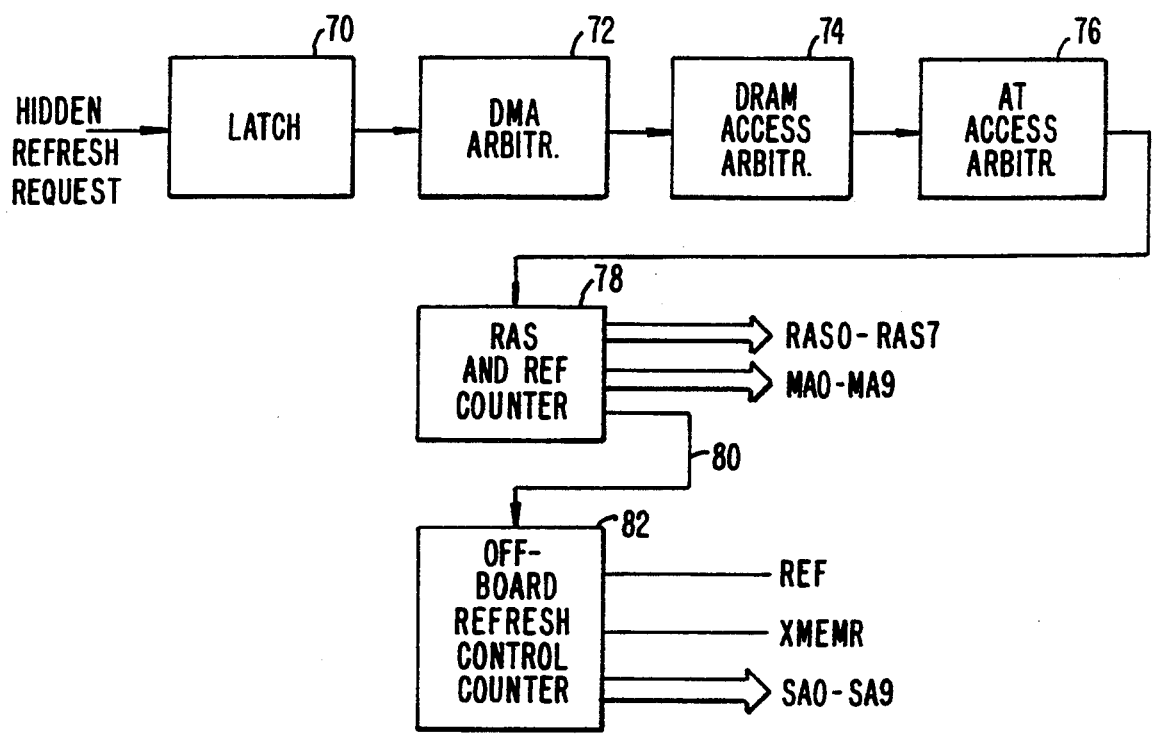
FIG. 6 is a block diagram of the hidden refresh control circuitry of the present invention.

FIG. 6 is a block diagram showing the implementation of the system of FIG. 5. A hidden refresh request is provided to a latch 70, with the output being provided to a DMA arbitration circuit 72. Upon successful arbitration, the output is provided to a DRAM access arbitration circuit 74. Upon successful completion of that arbitration, the signal is provided to an AT access arbitration circuit 76. Thereafter, hidden refresh is enabled and the counter 78 produces the RAS signals for the on-board DRAM along with the address signals, MA0–MA9. A separate signal on a line 80 is provided to an off-board counter 82 which produces the REF, XMEMR and address signals SA0–SA9 for the AT bus.

Figure 7:
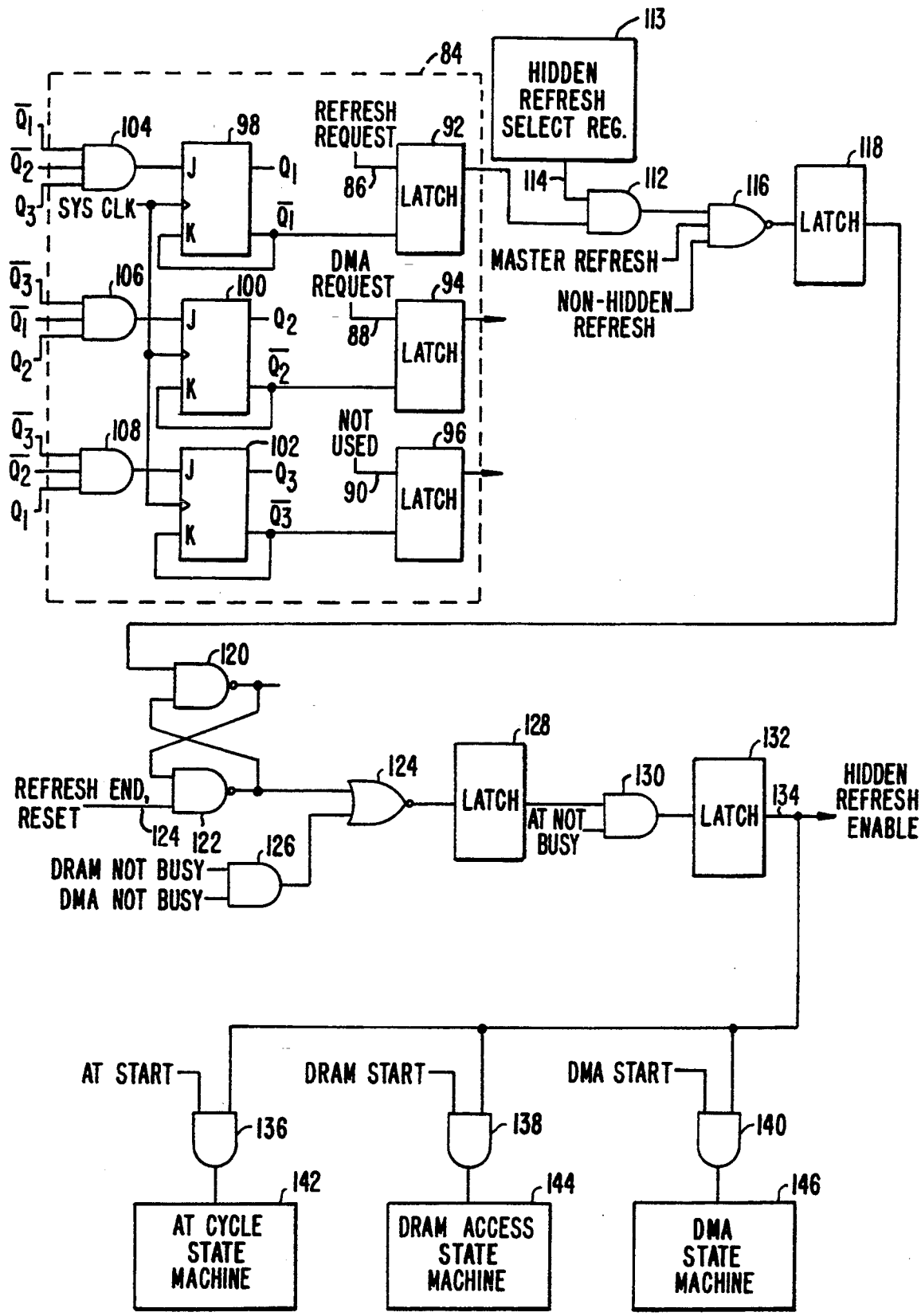
FIG. 7 is a more detailed drawing of FIG. 6 showing AT cycle,direct memory access and DRAM access arbitration.

FIG. 7 shows more detail of how the arbitration of FIG. 6 is done. A DMA arbitration circuit 84 selects between a refresh request on a line 86 and a DMA request on a line 88 which occur at about the same time. A separate input for another signal to be arbitrated is provided on a line 90 but not used for this invention. Essentially, a three-stage count is provided to sequentially select one of latches 92, 94 and 96. This three-stage count is provided with JK latches 98, 100 and 102 in combination with AND gates 104, 106 and 108 coupled as shown under the control of the system clock on line 110.

Upon winning the arbitration, a refresh signal is provided at the output of latch 92 to the input of an AND gate 112. The other input of AND gate 112 on line 114 is the hidden refresh select bit from a register 113 provided to programmably select hidden refresh mode. The output of AND gate 112 is provided to a NOR gate 116 which provides the hidden refresh signal, or a master refresh or a NON-hidden refresh signal to a latch 118. The output of latch 118 is provided to an SR latch composed of NAND gates 120 and 122 configured in a cross-coupled manner as shown. The other input is a signal indicating the end of a refresh or a power-on reset signal on a line 124. The output of NAND gate 122 is provided to a NOR gate 124. The other input of NOR gate 124 is from NAND gate 126. NAND gate 126 is provided with a DRAM not busy signal and a DMA not busy signal. The DMA not busy signal here is not redundant with the above DMA request arbitration. This signal is used to indicate that there is not a DMA access already in progress, which may take some time. The DMA arbitration circuit 84 is used for arbitrating with a substantially simultaneous DMA request signal, which may occur while there is already a DMA access in progress for a separate purpose.

When there is neither a DRAM access nor a DMA cycle, NOR gate 124 is enabled to provide its output to a latch 128. Latch 128 provides its output to an AND gate 130, which receives as its other input an AT not busy signal. This signal indicates that there is no AT cycle in progress. When this condition is satisfied, an output is provided to a latch 132 which provides a hidden refresh signal on line 134 to start the hidden refresh sequence. This sequence is accomplished with the counter circuits 78 and 82 of FIG. 6.

The hidden refresh enable signal is also provided as one input to AND gates 136, 138 and 140. The other input of these AND gates are start signals for an AT cycle, DRAM access cycle, and DMA cycle to respective state machines 142, 144 and 146. Thus, once a hidden refresh is granted, it disables subsequent AT, DRAM and DMA cycles until a refresh end signal is provided on line 124 to propagate through and clear latch 132. The refresh end signal is provided with a refresh cycle counter similar to counter 64 shown in FIG. 3.

FIG. 7 has been drawn with the minimum logic necessary to convey the operation of the present invention. It is to be understood that logical functions have been shown, and could be implemented in many different manners. In addition, additional logic necessary for the overall operation of the system has been omitted to enable a clear understanding of the invention.

As will be understood by those familiar with the art, the present invention may be embodied in other specific forms without departing from the spirit or essential characteristics thereof. Accordingly, the disclosure of the preferred embodiment of the invention is intended to be illustrative, but not limiting, of the scope of the invention which is set forth in the following claims.

What is claimed is:

1. In a computer system having a central processing unit (CPU), a dynamic random access memory (DRAM), first control means for controlling a direct memory access (DMA) cycle, second control means for controlling a local DRAM access, third control means for controlling an advanced technology (AT) bus access, and a bus network interconnecting said CPU, DRAM, first, second and third control means, an apparatus for refreshing said DRAM comprising:

hidden refresh latch means, having an input coupled to said bus network, for storing a signal indicating a hidden refresh mode;

timing means for periodically generating a refresh request signal at an output;

arbitration means, having a first input coupled to said timing means output and a second input coupled to an output of said latch means, for providing a hidden refresh enable signal only in said hidden refresh mode and when there is no memory access by said AT, DRAM and DMA control means, said arbitration means further including:

counting means for arbitrating between a simultaneous DMA request and refresh request, said counting means providing a sequential count to enable one of said refresh and said DMA request when a corresponding count is reached; and enabling means coupled to an output of said counting means for providing said refresh enable signal only when said enabling means receives a not busy signal from said DMA and said DRAM control means;

refresh counter means, coupled to said arbitration means and responsive to said hidden refresh enable signal, for providing a refresh end signal after a predetermined count sufficient for a refresh of said DRAM; and means, coupled to said AT, DRAM and DMA control means, for disabling said AT, DRAM and DMA control means in response to said hidden refresh enable signal, and for re-enabling said AT, DRAM and DMA control means in response to said refresh end signal.

* * * * *